Feb. 19, 1957 V. J. DAVIS 2,781,815
PNEUMATIC TIRE
Filed March 10, 1954 2 Sheets-Sheet 1

INVENTOR.
VANCE J. DAVIS
BY
Irwin M. Lewis
ATTORNEY.

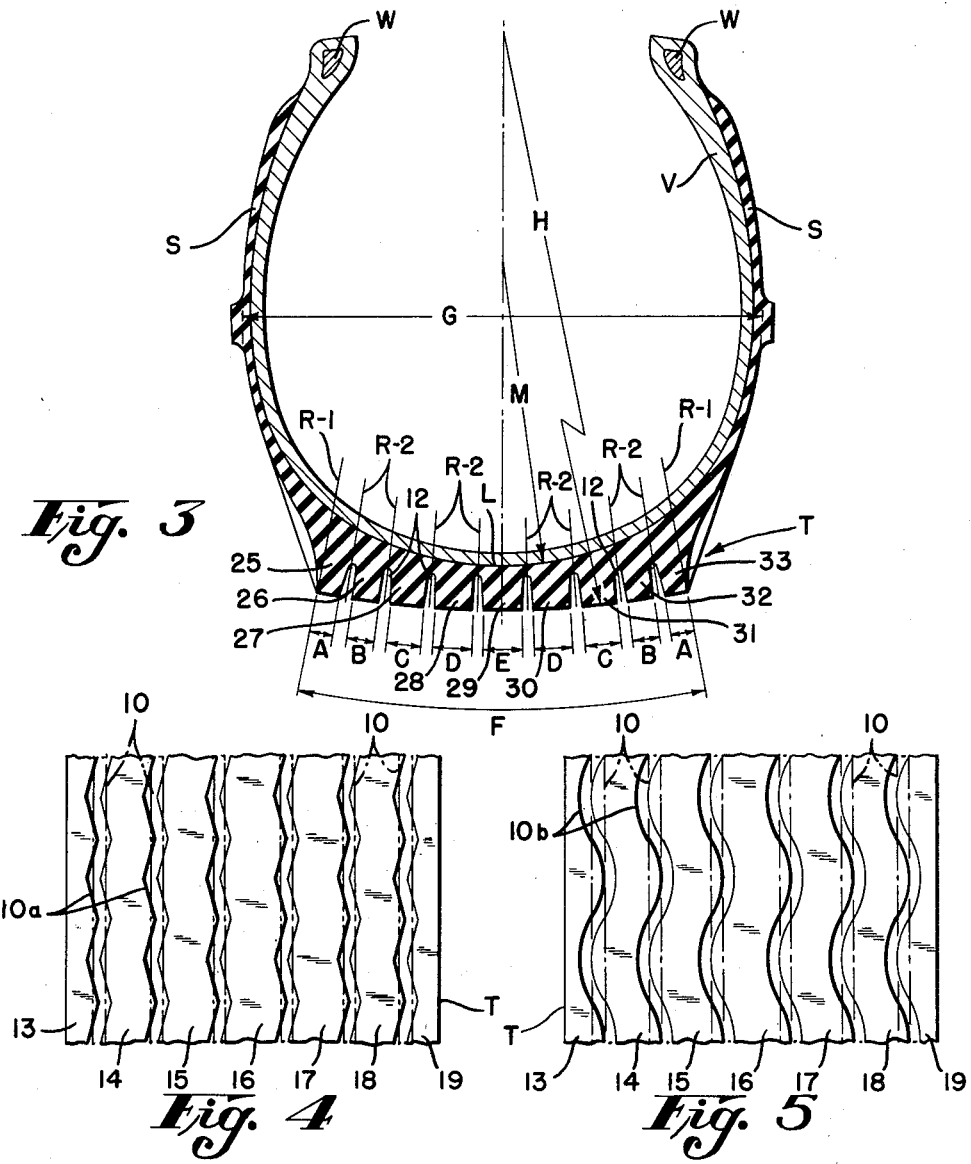

United States Patent Office 2,781,815
Patented Feb. 19, 1957

2,781,815

PNEUMATIC TIRE

Vance J. Davis, Detroit, Mich., assignor to United States Rubber Company, New York, N. Y., a corporation of New Jersey Application March 10, 1954, Serial No. 415,400

10 Claims. (Cl. 152—352)

This invention relates to pneumatic tires and in particular to pneumatic tires incorporating circumferentially ribbed treads.

Tires incorporating ribbed treads have been used for many years. In the past, the ribs, in most instances, were made of approximately equal width and the crown radius of the tread was relatively small to give a rounded tread contour. While tires incorporating such ribbed treads were satisfactory for older cars, this has not been found to be true with the advent of the more modern cars with their sensitive, soft wheel suspension systems, power steering, power brakes, and quieter operation. When used on modern cars, such tires "squeal" objectionably when the brakes of the car are applied or when the car is turned around corners even at the comparatively low speeds of urban driving. In addition, they emit an objectionable slapping noise, commonly known as "slap" when they go over seams or broken pavement in a street and tend to "nibble," i. e., skid out or weave back and forth when run along street car tracks or painted stripes in the street.

More recently, the trend has been to make the crown radius of pneumatic tires of a greater value to give a flatter tread and to make the centermost ribs of the tread of a comparatively small width and the outer ribs adjacent the shoulders of the tires and particularly the ribs next adjacent the outermost ribs of a width substantially greater than the center ribs. The theory behind this trend is that the greatest pressure on the tread surface of a tire under a load occurs adjacent the shoulders of the tire and decreases toward the center of the tread and that wider, heavier ribs should be placed adjacent the shoulders of the tire and narrower and lighter ribs should be placed at the center of the tread to correspond to the pressure distribution. Such tires, however, have also been found to be objectionable from the standpoint of "squeal," "slap," and "nibbling" and in addition have been found to be objectionable from the standpoint of steering effort and steering response when used on modern cars. "Nibbling" has been found to be particularly objectionable in so-called "tubeless tires" incorporating such ribbed treads, apparently due to the greater flexibility of such tires.

In contrast to this trend in ribbed tread design, I have found that "squeal," "slap" and "nibbling" may be eliminated or materially reduced, rolling resistance decreased, and stability, steering response, ease of steering, softness of ride, tread wear and uniformity of tread wear improved, particularly in what are termed "extra low pressure tires," if the crown radius of the tread is made comparatively large, i. e. between 145% of the cross section of the tire and infinity when the tire is mounted on a standard rim and inflated to standard pressure for maximum recommended load, and the tread made of gradually decreasing thickness towards the center of the tread; and if in addition, the centermost ribs, instead of being made narrower than the ribs next adjacent the outermost or shoulder ribs, are made wider than these ribs, and the outermost or shoulder ribs are made narrower than the ribs next adjacent thereto.

In a tire constructed in accordance with this invention the width of the ribs and the thickness of the tread rubber are so proportioned that the areas bounded by or defined by the surface of the tread, the rubber line, i. e. the line of juncture between the carcass and the tread rubber, and radial lines extending from the center point of the tread through the outer edges of the shoulder ribs and through the centers of the grooves separating the remaining ribs, are substantially equal.

The present invention and the advantages thereof having been broadly described above, a more detailed description is given hereafter by reference to the accompanying drawings, wherein:

Fig. 3 is a sectional view of a pneumatic tire incorporating nine circumferentially extending tread ribs proportioned in accordance with the present invention;

Figure 1:
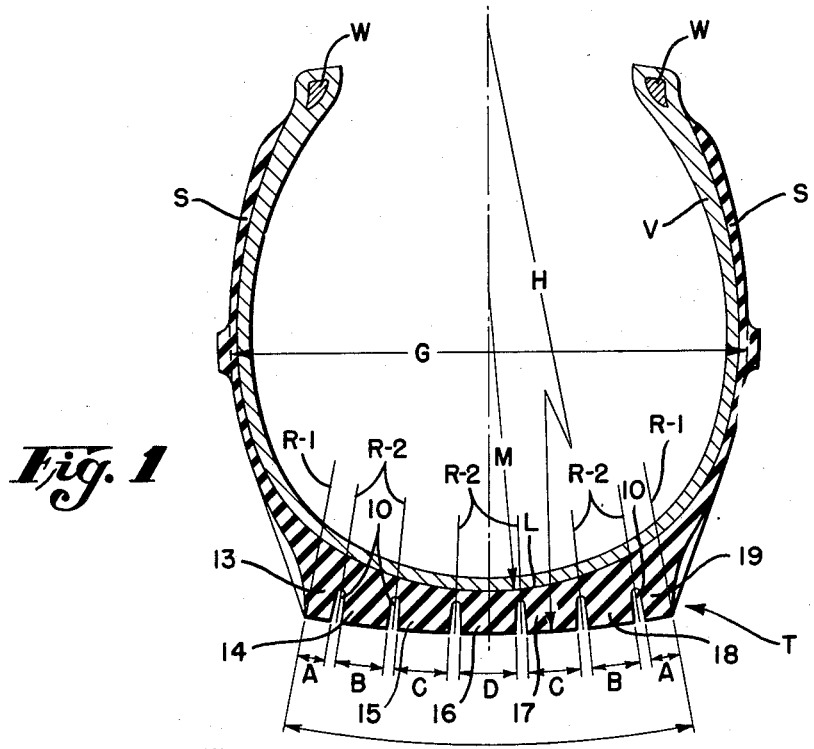
Fig. 1 is a sectional view of a pneumatic tire incorporating seven circumferentially extending tread ribs proportioned in accordance with the present invention.

Fig. 4 is a plan view of a portion of the tread of the tire of Fig. 1, showing the grooves separating the tread ribs as zig-zag in solid lines and straight in broken lines to illustrate how the groove appearance may be varied; and Fig. 5 is a plan view of a portion of the tread of the tire of Fig. 1, showing the grooves separating the tread ribs as sinuous in solid lines and straight in broken lines to further illustrate how the groove appearance can be varied.

Figure 2:
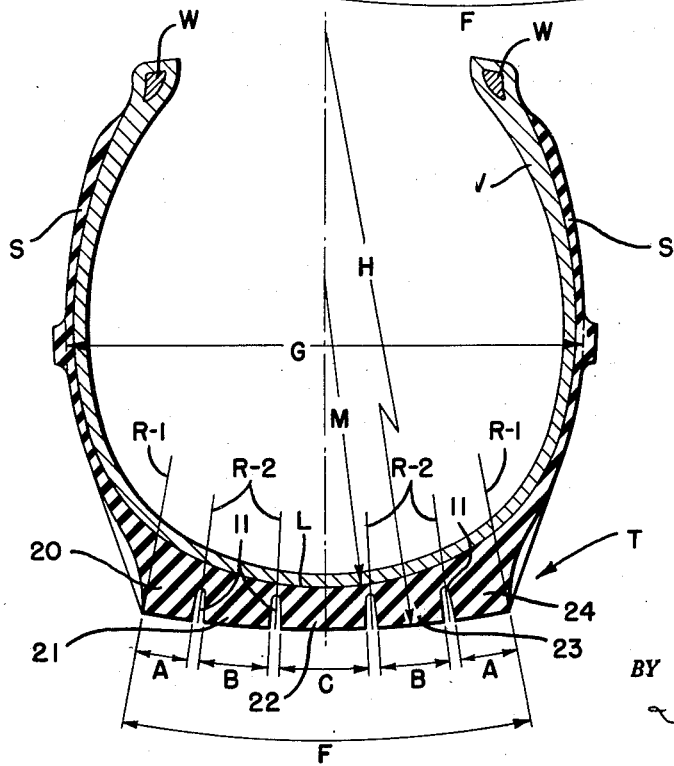
Fig. 2 is a sectional view of a pneumatic tire incorporating five circumferentially extending tread ribs proportioned in accordance with the present invention.

Referring to the drawings, the present invention is shown incorporated in a pneumatic tire having seven tread ribs in Fig. 1, five tread ribs in Fig. 2 and nine tread ribs in Fig. 3. It is to be understood, however, that this is for the purpose of illustration and that the invention is applicable to tires incorporating any number of tread ribs greater than five.

The tires shown in each of the figures, apart from the proportions of the crown radius of the tread and the rib widths, are of conventional construction and include a carcass V of strain resisting elements, bead wire bundles W, rubber composition sidewalls S, and a rubber composition tread T in which the circumferentially extending tread ribs separated by grooves of substantially uniform depth are formed in the conventional manner.

The grooves separating the ribs may be straight as shown in broken lines at 10 in Figs. 4 and 5, zig-zag as shown in solid lines at 10a in Fig. 4, sinuous as shown in solid lines at 10b in Fig. 5, or of any other desired pattern. While the zig-zag grooves 10a and the sinuous grooves 10b are shown incorporated in the seven rib tire of Fig. 1, it is to be understood that the separating grooves 11 of Fig. 2 and the separating grooves 12 of Fig. 3 may also be zig-zag, sinuous, or combinations thereof.

The term "groove" is used herein in its usual technical sense as understood to those skilled in the art to indicate that they are of a width such that they will not close up readily under a normal load, as contrasted with "slits" or "slots." The circumferentially extending ribs may be provided with slots, slits or lateral notches, (not shown) to increase the anti-skid and traction properties thereof so long as the transverse and circumferential functional continuity of the individual ribs is retained, i. e., the functional identity of the individual ribs is retained. If it is desired to utilize the tire as a "tubeless tire," i. e., without an inner tube, a liner (not shown) may be applied to the inner wall of the carcass in the manner well known in the art. The term "rubber" is used herein to indicate natural rubber, synthetic rubber or blends thereof, commonly used in the manufacture of pneumatic tires.

The present invention resides in the combination of the particular proportions of the tread rubber thickness, rib widths and crown radius, which result in elimination or material reduction of "squeal," "slap" and 'nibbling," decreased rolling resistance, and improved stability, steering response, ease of steering, tread wear, and uniformity of tread wear as compared with conventional rib arrangements and tread raw proportions.

In accordance with the invention, the crown radius of the tread, indicated by the dimension "H" in Figs. 1, 2 and 3, is from 145% of the tire section, as indicated by the dimension "G," to infinity when the tire is mounted on a standard rim and inflated to the standard pressure for maximum recommended load for the particular size tire to which the tread is applied as set forth in the 1952–1953 Year Book of The Tire & Rim Association, the term "tire section" is used as defined in the 1952–1953 Year Book of The Tire & Rim Association, viz., the width of a new tire including normal sidewalls, but not including protective side ribs, bars and decorations.

The rubber line L, i. e., the juncture line between the tread rubber T and the carcass V, is curved to a greater extent than the tread surface, i. e., the radius of the rubber line L, indicated by the dimension "M," is less than the crown radius "H" of the tread surface, so that the thickness of tread rubber, as measured from the tread surface to the rubber line L, including cap and base if such a construction is used, gradually decreases in thickness from the shoulders of the tread towards the center of the tread.

The outermost ribs adjacent the shoulders of the tires, i. e., ribs 13 and 19 of Fig. 1, ribs 20 and 24 of Fig. 2, and ribs 25 and 33 of Fig. 3, are each of a width, as indicated by the dimension "A," less than the width, as indicated by the dimension "B" of each of the ribs next adjacent the outermost ribs, i. e., ribs 14 and 18 of Fig. 1, ribs 21 and 23 of Fig. 2, and ribs 26 and 32 of Fig. 3, and the remaining centermost ribs or rib, i. e., ribs 15, 16 and 17 of Fig. 1, rib 22 of Fig. 2, and ribs 27, 28, 29, 30 and 31 of Fig. 3 are each of a width, as indicated by the dimensions "C," "D" and "E," greater than the width "B" of the ribs next adjacent the outermost ribs of the respective tires. If the grooves separating the ribs are made zig-zag or sinuous, the mean width of the ribs are proportioned as given above.

Preferably, the centermost rib 16 of the tire of Fig. 1 is wider than the ribs 15 and 17. Similarly the rib 29 of the tire of Fig. 3 is preferably wider than ribs 28 and 30 and ribs 28 and 30 are preferably wider than ribs 27 and 31. As so proportioned, it can be seen that the ribs of each of the tires of Figs. 1, 2 and 3 increase in width toward the center of the tread but decrease in depth, as measured from the tread surface to the rubber line L, towards the center of the tread.

In addition to maintaining the proportions given above, the rib widths are so proportioned that each area bounded by or defined by the outer tread surface, the rubber line L and radial lines R–1 extending from the center of curvature of the tread surface through the outer edges of the shoulder ribs, i. e., ribs 13 and 19 of Fig. 1, ribs 20 and 24 of Fig. 2, and ribs 25 and 33 of Fig. 3, and radial lines R–2 extending from the center of the curvature of the tread surface through the center of the grooves 10, 11 or 12 of the respective tires separating the shoulder ribs and the ribs next adjacent thereto, i. e., ribs 14 and 18 of Fig. 1, ribs 21 and 23 of Fig. 2, and ribs 26 and 32 of Fig. 3, and each of the areas defined by or bounded by the surface of the tread, the rubber line L and adjacent radial lines R–2 extending from the center of curvature of the tread surface through the center of each of the grooves 10, 11 and 12 separating the remaining ribs of the respective tires of Figs. 1, 2 and 3, are substantially equal.

Expressed in another manner, the relative widths of the tread ribs are so proportioned that the area between the tread surface, the rubber line L and radial lines R–1 extending through the outer edges of the shoulder ribs, i. e., ribs 13 and 19 of Fig. 1, ribs 20 and 24 of Fig. 2, and ribs 25 and 33 of Fig. 3, will be divided into approximately equal areas by radial lines R–2 extending from the center of curvature of the tread surface through the center of each of the grooves 10, 11 or 12 of the respective tires of Figs. 1, 2 or 3.

To express the foregoing concept in still another manner, it will be seen that the cross-sectional areas of each of the tread segments in which each of the ribs is located are all substantially equal in value, i. e., the area of tread rubber in and under each rib is substantially the same in each instance, in a given embodiment of the invention.

The following dimensions for the rib widths of the tires illustrated in Figs. 1, 2 and 3, expressed in percentage of the over-all tread widths "F," for tires having a tread or crown radius "H" of from 145% to 200% of the tire section "G" and, an over-all tread width "F" of from 58% to 65% of the tire section "G," are given by way of example to illustrate the invention.

Fig. 1.—Seven tread ribs

| Rib width: | Percent of "F" |
| --- | --- |
| "A" | 7.68 |
| "B" | 12.25 |
| "C" | 14.02 |
| "D" | 16.52 |

Fig. 2.—Five tread ribs

| Rib width: | Percent of "F" |
| --- | --- |
| "A" | 14.67 |
| "B" | 18.83 |
| "C" | 22.65 |

Fig. 3.—Nine tread ribs

| Rib width: | Percent of "F" |
| --- | --- |
| "A" | 6.26 |
| "B" | 7.23 |
| "C" | 9.49 |
| "D" | 10.89 |
| "E" | 11.56 |

When a ribbed tire tread is proportioned as above described, "squeal," "slap" and "nibbling" will be eliminated or materially reduced, rolling resistance decreased, and stability, steering response, ease of steering, softness of ride, tread wear, and uniformity of tread wear will be improved particularly when the tread is incorporated in "extra low pressure tires" and "tubeless tires" and used on present day cars. These advantages are obtained independent of the depth of the grooves separating the ribs.

The numerous advantages of this invention have been proven by empirical methods to be the result of the described rib distribution across the tread in combination with the relatively large crown radius of the tire. This results in an equal mass distribution of rubber in each rib area defined by the tread surface, the rubber line L, and the radial lines R–1 and R–2, irrespective of whether the tire embodies five or more ribs. With the tread rubber distributed in this manner, the ribs have increasing lateral stability from the shoulder ribs to the center rib and increasing radial stability from the center rib to the shoulder ribs. While the theory upon which the optimum performance of the tire is obtained may at present be somewhat obscure, numerous tires constructed in accordance with this invention have upon exhaustive tests performed in a manner to obtain all of the advantages hereinbefore set forth.

While certain embodiments of the invention have been shown and described, it is to be understood that they are for the purpose of illustration only and not by way of limitation and that changes and modifications can be made therein without departing from the spirit and scope of the invention.

Having thus described my invention, what I claim and desire to protect by Letters Patent is:

1. A pneumatic tire having a carcass of strain-resisting elements and a rubber tread of decreasing thickness towards the center of the tread, said tread having at least five circumferentially extending and functionally continuous ribs separated by circumferentially extending grooves formed in the surface thereof and a crown radius of between 145% of the tire section and infinity when the tire is mounted on a rim and inflated, each of the outermost of said ribs having a mean width less than the mean width of each of the ribs next adjacent thereto, and each remaining rib having a mean width greater than the mean width of each of said ribs next adjacent said outermost ribs the cross-sectional area of each tread segment in which each of said ribs is located being substantially the same.

2. A pneumatic tire having a carcass of strain-resisting elements and a rubber tread of decreasing thickness towards the center of the tread, said tread having at least five circumferentially extending and functionally continuous ribs separated by circumferentially extending grooves formed in the surface thereof and a crown radius of between 145% of the tire section and infinity when the tire is mounted on a rim and inflated, the mean width of said ribs being so proportioned that each of the areas defined by the outer surface of said tread, the rubber line between said tread and said carcass, and lines extending radially from the center of curvature of said tread through the shoulder edges of the outermost ribs adjacent the shoulders of said tread and through the center of the grooves separating said outermost ribs and the ribs next adjacent said outermost ribs and each of the areas defined by the outer surface of said tread, the rubber line and adjacent lines extending radially from said center of curvature of said tread through the center of each of the grooves separating adjacent ribs is substantially the same.

3. A pneumatic tire having a carcass of strain-resisting elements and a rubber tread of decreasing thickness towards the center of the tread, said tread having at least five circumferentially extending and functionally continuous ribs, said ribs decreasing in width from the center of the tire toward the shoulders of the tire, said ribs being separated by circumferentially extending grooves formed in the surface thereof and a crown radius of between 145% of the cross section of the tire and infinity when the tire is mounted on a rim and inflated, the mean widths of said ribs being so proportioned that the area contained between the tread surface, the rubber line between the carcass and the tread rubber and radial lines extending from the center of curvature of the tread surface through the shoulder edges of the outermost ribs will be divided into substantially equal portions by radial lines extending from said center of curvature of the tread surface through the center of each of the grooves separating said ribs.

4. A pneumatic tire having a carcass of strain-resisting elements and a rubber tread of decreasing thickness towards the center of the tread, said tread having seven circumferentially extending and functionally continuous ribs separated by circumferentially extending grooves formed in the surface thereof and a crown radius of between 145% of the tire section and infinity when the tire is mounted on a rim and inflated, each of the outermost of said ribs having a width less than the width of each of the ribs next adjacent thereto, the three remaining ribs having a width greater than said ribs next adjacent said outermost ribs, and the centermost rib of said three remaining ribs having a width greater than the other two of said three remaining ribs the cross-sectional area of each tread segment in which each of said ribs is located being substantially the same.

5. A pneumatic tire having a carcass of strain-resisting elements and a rubber tread of decreasing thickness towards the center of the tread, said tread having nine circumferentially extending and functionally continuous ribs formed in the surface thereof and a crown radius of between 145% of the tire section and infinity when the tire is mounted on a rim and inflated, each of the outermost of said ribs having a width less than the width of each of the ribs next adjacent thereto, each of said five remaining center ribs being wider than each of said ribs next adjacent said outermost ribs, the centermost rib of said five remaining ribs being wider than the two ribs next adjacent thereto, and said two ribs of said five remaining ribs next adjacent said centermost rib being wider than the two remaining ribs of said five ribs next adjacent thereto the cross-sectional area of each tread segment in which each of said ribs is located being substantially the same.

6. A pneumatic tire having a carcass of strain-resisting elements and a rubber tread of decreasing thickness towards the center of the tread, said tread having seven circumferentially extending and functionally continuous ribs separated by circumferentially extending grooves formed in the surface thereof and a crown radius of between 145% of the cross section of the tire and infinity when the tire is mounted on a rim and inflated, the mean width of each of said seven ribs being so proportioned that the area between the tread surface, the rubber line between the carcass and the tread rubber and radial lines extending from the center of curvature of the tread surface through the shoulder edges of the outermost ribs will be divided into approximately equal areas by radial lines extending from the center of curvature of the tread surface through the centers of each of the grooves separating said seven ribs.

7. A pneumatic tire having a carcass of strain-resisting elements and a rubber tread of decreasing thickness towards the center of the tread, said tread having at least five circumferentially extending and functionally continuous ribs separated by circumferentially extending grooves formed in the surface thereof and a crown radius of between 145% of the tire section and infinity when the tire is mounted on a rim and inflated, the width of the outermost ribs being so proportioned that each area bounded by the tread surface, the rubber line, and radial lines extending from the center of curvature of the tread surface through the shoulder edges of the outermost ribs and through the centers of the grooves separating said outermost ribs from the said ribs next adjacent thereto and each area bounded by the tread surface, the rubber line, and radial lines extending from the center of curvature of said tread through each of the grooves separating said ribs next adjacent said outermost ribs from inwardly adjacent ribs is substantially the same, and each remaining rib having a width greater than the width of each of said ribs next adjacent to said outermost ribs.

8. A pneumatic tire having a carcass of strain-resisting elements and a rubber tread of decreasing thickness towards the center of the tread, the over-all tread width being from 58% and 65% of the tire section and the crown radius of the tread being between 145% and 200% of the tire section when the tire is mounted on the rim and inflated, said tread having seven circumferentially extending and functionally continuous ribs separated by circumferentially extending grooves formed in the surface thereof, the width of each of the outermost of said ribs being equal to approximately 7.68% of the over-all tread width, the width of each of the ribs next adjacent the outermost ribs being equal to approximately 12.25% of the over-all width of the tread, the two ribs next adjacent the center rib each having a width equal to approximately 14.02% of the over-all tread width, and the center rib having a width equal to approximately 16.52% of the over-all tread width the cross-sectional area of each tread segment in which each of said ribs is located being substantially the same.

9. A pneumatic tire having a carcass of strain-resisting elements and a rubber tread of decreasing thickness towards the center of the tread, the over-all width of said tread being from 58% to 65% of the tire section and the crown radius of said tread being from 145% to 200% of the tire section when the tire is mounted on a rim and inflated, said tread having five circumferentially extending and functionally continuous ribs separated by circumferentially extending grooves formed in the surface thereof, the outermost of said ribs being of a width equal to approximately 14.67% of the over-all tread width, the ribs next adjacent said outermost ribs being of a width equal to approximately 18.83% of the over-all tread width, and the remaining center rib being of a width equal to approximately 22.65% of the over-all tread width the cross-sectional area of each tread segment in which each of said ribs is located being substantially the same.

10. A pneumatic tire having a carcass of strain-resisting elements and a rubber tread of decreasing thickness towards the center of the tread, the over-all width of the tread being from 58% to 65% of the tire section and the crown radius of the tread being from 145% to 200% of the tire section when the tire is mounted on a rim and inflated, said tread having nine circumferentially extending and functionally continuous ribs separated by circumferentially extending grooves formed in the surface thereof, the outermost of said ribs each having a width equal to approximately 6.26% of the over-all tread width, the ribs next adjacent said outermost ribs each having a width equal to approximately 7.23% of the over-all tread width, the ribs next adjacent inwardly of said last mentioned ribs having a width equal to approximately 9.49% of the over-all tread width, the ribs next adjacent inwardly from said last mentioned ribs having a width equal to approximately 10.89% of the over-all tread width and the remaining center rib having a width equal to approximately 11.56% of the over-all tread width the cross-sectional area of each tread segment in which each of said ribs is located being substantially the same.

References Cited in the file of this patent

UNITED STATES PATENTS

| | | |
|---|---|---|
| 2,404,579 | Coben | July 23, 1946 |
| 2,600,231 | Ewart | June 10, 1952 |
| 2,675,047 | Andy | Apr. 13, 1954 |

FOREIGN PATENTS

| | | |
|---|---|---|
| 993,870 | France | July 25, 1951 |